US008577170B2

(12) United States Patent
Omer et al.

(10) Patent No.: US 8,577,170 B2
(45) Date of Patent: Nov. 5, 2013

(54) SHADOW DETECTION IN A SINGLE IMAGE

(75) Inventors: Ido Omer, Seattle, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 78 days.

(21) Appl. No.: 13/234,116

(22) Filed: Sep. 15, 2011

(65) Prior Publication Data

US 2013/0071016 A1 Mar. 21, 2013

(51) Int. Cl.
*G06K 9/00* (2006.01)
*G06K 9/64* (2006.01)
*H04N 7/18* (2006.01)

(52) U.S. Cl.
USPC .............................. 382/274; 382/103; 348/94

(58) Field of Classification Search
USPC ......... 382/103, 106, 107, 149, 162, 168, 181, 382/189, 203, 232, 255, 260, 274, 275, 276, 382/318, 286, 291, 295; 356/601, 621; 348/699–700
See application file for complete search history.

(56) References Cited

U.S. PATENT DOCUMENTS

| | | | | |
|---|---|---|---|---|
| 6,208,417 B1 * | 3/2001 | Itagaki et al. | .................. | 356/601 |
| 6,349,113 B1 * | 2/2002 | Mech et al. | .............. | 375/240.08 |
| 6,956,898 B1 * | 10/2005 | Podilchuk et al. | ............ | 375/240 |
| 7,366,323 B1 * | 4/2008 | Yao et al. | ....................... | 382/103 |
| 7,639,878 B2 | 12/2009 | Ibrahim et al. | | |
| 8,045,761 B2 * | 10/2011 | Badawy et al. | ............... | 382/104 |
| 2010/0150442 A1 * | 6/2010 | Kim et al. | ..................... | 382/167 |
| 2010/0232705 A1 * | 9/2010 | Li et al. | .......................... | 382/195 |

OTHER PUBLICATIONS

Wei Zhang; Wu, Q.M.J.; , "Moving shadow detection based on normalized eigenvalue of Wishart matrix," Mechatronics and Automation (ICMA), 2010 International Conference on , vol., no., pp. 645-650, Aug. 4-7, 2010.*
Xu et al, Shadow Removal from a Single Image, ISDA '06 Proceedings of the Sixth International Conference on Intelligent Systems Design and Applications—vol. 02 pp. 1049-1054.*
Murali et al, Shadow Detection and Removal from a Single Image Using LAB Color Space, Cybernetics and Information Technologies • vol. 13, No. 1 Sofia • 2013 , DOI: 10.2478/cait-2013-0009.*
Guo et al, Single-image shadow detection and removal using paired regions, Computer Vision and Pattern Recognition (CVPR), 2011 IEEE Conference on , Jun. 2011.*
Tian, et al., "Tricolor Attenuation Model for Shadow Detection", Retrieved at <<http://ieeexplore.ieee.org/stamp/stamp.jsp?tp=&arnumber=5156272>>, IEEE Transactions on Image Processing, vol. 18, No. 10, Oct. 2009, pp. 2355-2363.

(Continued)

Primary Examiner — Andrae S Allison (57) ABSTRACT

A digital image is divided into patches of pixels, or "superpixels", where each of the pixels in the patch has approximately the same color value and each of the patches is of approximately the same size. Subsequently, eigenvalues are generated for each patch based on the color values of the individual pixels in the patch, as expressed in a multidimensional color-space. A ratio between the first largest eigenvalue and the second largest eigenvalue for each patch is determined and is then, subsequently, normalized, either based on the intensity of the corresponding patch or normalized to a range between zero and one. The resulting values are compared to a threshold to identify those regions of the digital image that are deemed to be in shadow, thereby generating a shadow mask for the digital image, or are weighted to generate a shadow probability mask.

20 Claims, 4 Drawing Sheets

(56) References Cited

OTHER PUBLICATIONS

Song, et al., "Image-Based Traffic Monitoring With Shadow Suppression", Retrieved at <<http://ieeexplore.ieee.org/stamp/stamp.jsp?tp=&arnumber=4142935>>, Proceedings of the IEEE, vol. 95, No. 2, Feb. 2007, pp. 413-426.

Zhang, et al., "Moving shadow detection based on normalized eigenvalue of Wishart matrix", Retrieved at <<http://ieeexplore.ieee.org/stamp/stamp.jsp?tp=&arnumber=5588232>>, Proceedings of the IEEE International Conference on Mechatronics and Automation, Aug. 4-7, 2010, pp. 645-650.

Yao, et al., "Systematic static shadow detection", Retrieved at <<http://ieeexplore.ieee.org/stamp/stamp.jsp?tp=&arnumber=5588232>>, Proceedings of the 17th International Conference on Pattern Recognition, vol. 2, Aug. 23-26, 2004, pp. 4.

Guo, et al., "Single-Image Shadow Detection and Removal using Paired Regions", Retrieved at <<http://www.cs.uiuc.edu/homes/dhoiem/publications/cvpr11_shadow.pdf>>, IEEE Conference on Computer Vision and Pattern Recognition, Jun. 20-25, 2011, pp. 2033-2040.

Xu, et al., "Shadow Removal from a Single Image", Retrieved at <<http://ieeexplore.ieee.org/stamp/stamp.jsp?tp=&arnumber=4021808, Proceedings of the Sixth International Conference on Intelligent Systems Design and Applications, Oct. 16-18, 2006, pp. 1049-1054.

Fredembach, et al., "Automatic and accurate shadow detection from (potentially) a single image using near-infrared information", Retrieved at <<http://infoscience.epfl.ch/record/147809/files/nirshadows_pami.pdf>>, IEEE Transactions on Pattern Analysis and Machine Intelligence, 2010, pp. 12.

"Automatic Localized Adjustment of Image Shadow and Highlights", U.S. Appl. No. 13/034,811, filed Feb. 25, 2011, pp. 52.

\* cited by examiner

SHADOW DETECTION IN A SINGLE IMAGE

BACKGROUND

Automated processing of digital images is often based on the color values of individual pixels in a digital image. However, digital images, such as pictures taken by a digital camera, often capture scenes that include direct lit areas and also areas that are in shadow. As will be recognized by those skilled in the art, the areas that are in shadow are represented, in the digital image, by pixels that have less intensity, or otherwise different color values. Often, automated processing of digital images cannot distinguish between a darker object and an object that is simply in shadow. Consequently, to provide for more accurate automated processing of digital images it is desirable to be able to identify those regions, in a digital image, that are in shadow and, thereby, account for such shadows in the automated processing.

Traditional mechanisms for identifying those regions, in a digital image, that are in shadow were based on the color values of the individual pixels in the digital image. More specifically, those pixels with darker colors were determined to be in shadow, while those pixels with lighter colors were determined to be directly lit objects. As is known by those skilled in the art, however, such traditional mechanisms had a difficult time distinguishing between dark objects that were directly lit and other objects, whether dark or not, that were simply in shadow.

Another traditional mechanism for identifying those regions, in a digital image, that are in shadow was based on the ability to digitally capture, not only the visible light, but near infrared (NIR) light as well. Subsequently, those areas of the scene that were in shadow could be identified based on a comparison between the visible light and the NIR light. Obviously, such a mechanism could not be implemented if the digital imaging equipment did not comprise the ability to capture NIR light.

SUMMARY

In one embodiment, a shadow mask, delineating between regions of a digital image corresponding to physical objects that are directly lit and regions of a digital image corresponding to physical objects that are in shadow, can be generated from a single digital image of those objects. In such an embodiment, the generation of the shadow mask can be informed by a ratio between a first largest eigenvalue and a second largest eigenvalue of the color values of small patches of individual pixels in the digital image.

In another embodiment, a digital image is divided into patches of pixels, or "superpixels", where each pixel in the patch is of a similar color or, more precisely, where each pixel in the patch has a color in approximately the same location in color-space. Additionally, each patch, or "superpixel" can be of approximately the same size.

In a further embodiment, the ratio between the first and second eigenvalues of the superpixels can be subsequently normalized by an intensity of the superpixel. A threshold can then be applied to generate the shadow mask. Alternatively, the ratio between the first and second eigenvalues can be normalized to a range between zero and one, thereby generating a shadow probability mask.

In a still further embodiment, the superpixels can be selected to be of approximately equal size and can be selected to avoid edge conditions, where the color values in the digital image transition sharply. Alternatively, the division of the digital image into superpixels can be performed without regard to edge conditions and superpixels straddling an edge can be subsequently rejected as noisy.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to mechanisms for generating shadow masks from single digital images. A digital image can be divided into patches of pixels, or "superpixels", where each of the pixels in the patch has approximately the same color value and each of the patches is of approximately the same size. Subsequently, eigenvalues can be generated for each patch based on the color values of the individual pixels in the patch, as expressed in a multidimensional color-space. A ratio between the first largest eigenvalue and the second largest eigenvalue for each patch can be determined and can then, subsequently, be normalized based on the intensity of the corresponding patch. The resulting values can be compared to a threshold to identify those regions of the digital image that are deemed to be in shadow, thereby generating a shadow mask for the digital image. Alternatively, the ratio between the first and second largest eigenvalues can be normalized to a range of values between zero and one, thereby generating a shadow probability mask For purposes of illustration, the techniques described herein make reference to a typical scenario, namely the generation of shadow masks for individual images obtained by an aerial camera that takes pictures of the ground for purposes of automatically analyzing those images to identify features such as roads, buildings, rivers, and other like features. Such references, however, are strictly exemplary and are not intended to limit the mechanisms described to the specific examples provided. Indeed, the techniques described are applicable to any digital image of any physical objects in a physical scene, whether such objects in such a scene were originally captured in digital form, or whether a prior analog image of such a scene was subsequently digitized. Likewise, the techniques described are equally applicable to physical objects in physical scenes illuminated by any directional light source, including natural light sources, such as the sun, and man-made light sources, such as lamps, flashes, light bulbs, and other like man-made light sources.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
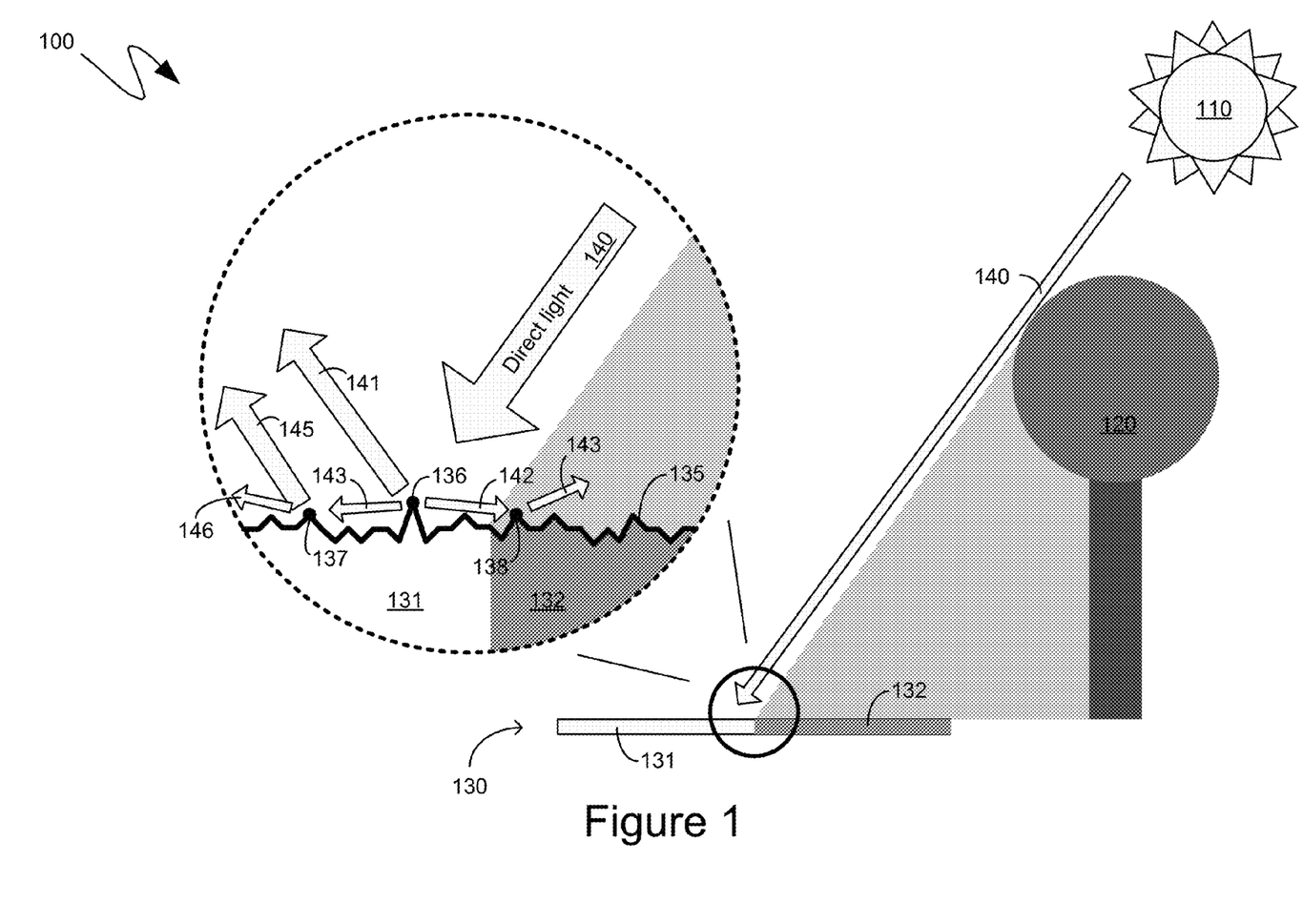
FIG. 1 is a block diagram of an exemplary behavior of light as reflected from both directly lit surfaces and surfaces in shadow.

Turning to FIG. 1, an exemplary system 100 is shown for purposes of providing context for the descriptions below. The exemplary system 100 comprises a physical object 130 that is partially in a shadow cast by the physical object 120 in a scene illuminated by sunlight from the sun 110. The physical object 130 is, therefore, divided into a directly lit area 131, on which the sun 110 shines directly, and a shadow area 132 that is within the shadow cast by the object 120, and which is not illuminated by direct sunlight.

As will be recognized by those skilled in the art, images of a scene, such as that illustrated by the system 100 of FIG. 1, are based upon the light that is reflected off of physical objects, such as the physical object 130. And while many physical objects can appear to be smooth, at a microscopic level the vast majority of physical objects exhibit some measure of roughness, or surface variations. Such surface variations are illustrated in FIG. 1 via the surface 135 of the physical object 130. As can be seen, due to such surface variations, light incident on the surface 135 can be reflected omnidirectionally.

More specifically, the portion of the surface 135 that is exposed to light from the sun 110 can have such sunlight, illustrated as the direct light 140, incident upon such a surface. The light 140 can be reflected by the surface 135 in multiple directions. For example, at the point 136 on the surface 135, the direct light 140 can predominantly be reflected in an upward direction, as illustrated by the reflection 141, but can also be at least partially reflected in a transverse direction, such as is illustrated by the reflections 142 and 143. Similarly, at the point 137 on the surface 135, the direct light 140 can, again, be predominantly reflected in an upward direction, as illustrated by the reflection 145, but can also be at least partially reflected in a transverse direction, such as is illustrated by the reflection 146.

On the other hand, the portion of the surface 135 that is not exposed to light from the sun 110 directly can, instead, be illuminated by light reflected from other physical objects in the surrounding area. Just as one example, the direct light 140 that was reflected off of the point 136 on the surface 135 as the reflection 142 can illuminate the point 138 on the surface 135 that is in the shadow area 132, resulting in the reflection 143.

As can be seen from the illustration of FIG. 1, objects that are illuminated by direct sunlight can reflect that direct sunlight in primarily a directional, or "specular", manner. By contrast, objects that are in shadow do not receive light primarily from a single source and, instead, receive reflected light from all directions. Consequently, objects that are in shadow do not reflect light in primarily a directional manner, but instead reflect light in mostly an omnidirectional, or "Lambertian", manner. While the below-described mechanisms utilize such a difference to distinguish between objects in shadow and objects that are directly lit, they are not so limited. More specifically, objects in shadow may not reflect light in a purely Lambertian manner and may exhibit some amount of specular reflection. Nevertheless, the magnitude of the specular reflection is likely to be substantially less for objects in shadow as compared to objects that are directly lit. Consequently, the below-described mechanisms are equally applicable to objects in shadow that do not exhibit pure Lambertian scattering, but instead also exhibit some amount of specular scattering.

Because of this difference in the manner in which light is reflected, an image of such objects can show a directional color change in substantially uniformly colored objects that are directly lit, while those substantially uniformly colored objects that are in shadow may not exhibit such a directional change. Colloquially, an object that is mostly the same color, such as a red ball, will appear to be the same color red throughout its surface when placed in shadow, but, when placed in direct sunlight, will appear to be a brighter shade of red in areas that are reflecting the sunlight incident upon those areas directly towards the viewer and will appear to be a darker shade of red any areas that are not reflecting the sunlight incident on those areas directly towards the viewer. Of course, as will be recognized by those skilled in the art, changes in the appearance of an object, such as changes in the color of the light being reflected off of it, can also be due to the changes in the color of the light that is incident on the object in the first place and underlying color changes in the material of the object itself. Such other influences can be minimized by, for example, applying the below-described mechanisms to small patches, or areas, of an object where any color variations of the material of the object itself are minimized. Similarly, such other influences can be minimized by, for example, applying the below-described mechanisms to environments where there is a not a substantial difference in the color of the light incident upon objects, such as in outdoor environments where the light is sourced almost entirely by the sun. Nevertheless, while such mechanisms can limit other influences to the color of light being reflected off of an object, those other influences are not likely to be eliminated and the below-described mechanisms require no such elimination in order to provide accurate results. In a digital image, the above-described directional color changes can result in the color values of individual pixels varying in a directional manner. When those color values of the individual pixels are expressed as points in a multi-dimensional color-space, directional changes in the color can be quantified mathematically through eigenvectors and corresponding eigenvalues.

As a specific example, a two-by-two collection of pixels in a digital image can define four points in a multidimensional color-space, such as a three-dimensional Red, Green, Blue (RGB) color-space. Those four points also define a square matrix in the three-dimensional RGB color space, from which three eigenvectors, orthogonal to one another in the three-dimensional RGB color space, can be calculated in the traditional manner. Within the context presented herein, the eigenvectors point in the direction of color change. The eigenvector having the largest eigenvalue points in the direction of the most amount of color change, while the other eigenvectors, by definition, point in orthogonal directions that are also orthogonal to one another.

As utilized herein, the terms "first largest eigenvalue" and "first eigenvalue" refer to the largest eigenvalue from among the eigenvalues associated with eigenvectors in a multidimensional color-space. Similarly, as utilized herein, the terms "second largest eigenvalue" and "second eigenvalue" refer to the second largest eigenvalue from among the eigenvalues associated with eigenvectors in the multidimensional color-space. As indicated previously, the eigenvectors associated with the first and second eigenvalues will, by definition, be orthogonal to one another and to all other eigenvectors in the multidimensional color-space.

Returning back to the specific example illustrated in FIG. 1, a digital image of the scene formed by the system 100 can comprise a collection of pixels that represents the physical object 130. A small portion of that collection of pixels, such as, for example, a two-by-two patch of pixels, can have eigenvectors in color-space, such as described above. The first eigenvalue will be associated with an eigenvector that points in the direction of the greatest amount of color change among those pixels in that patch. Similarly, the second largest eigenvalue can be associated with an eigenvector that points in the direction of the second greatest amount of color change, that is also orthogonal to the first eigenvector. If the first eigenvalue is substantially greater than the second eigenvalue, then the change in color can be due to the specular scattering described above. As indicated, that specular scattering can be due to a predominant light source, such as direct light. Consequently, a determination can be made that the selected patch of pixels was of the portion 131, of the physical object 130, that was in direct sunlight. By contrast, if the first eigenvalue is not substantially greater than the second eigenvalue, and, instead, they are both of approximately equal magnitude, then such an omnidirectional change in color can be due to the Lambertian scattering that was also described above. Such Lambertian scattering, as indicated previously, can be an indication of light being incident on such a physical object from multiple directions, which can be consistent with an object in shadow that is being illuminated omnidirectionally by the scattering of light from objects all around it. Thus, if the first eigenvalue is not substantially greater than the second eigenvalue, a determination can be made that the selected patch of pixels was of the portion 132, of the physical object 130, that was in shadow.

While the above descriptions were provided within the context of a single patch of a digital image that is only comprised of a few pixels, such a context was selected merely for ease of description. Instead, due to variances in surface colors and other real-world imperfections, the above-described correlation between the relative magnitudes of the first and second eigenvalues and whether an object is directly lit or in shadow may not necessarily hold true for each individual patch of pixels. However, from a macro perspective, such random variations and physical imperfections can cancel out and, consequently, across large portions of a digital image, a correlation can be established between the relative magnitudes of the first and second eigenvalues and whether an object is directly lit or in shadow such that such relative magnitudes of the first and second eigenvalues can be used as indicators by which to determine whether a corresponding patch of pixels represents an object that is directly lit or is in shadow.

Additionally, while the above examples have been based on a three-dimensional color-space, and an two-by-two collection of pixels, none of the mechanisms described herein are so limited and are, instead, equally applicable to any multidimensional color-space and any size collection of pixels. In particular, the mechanisms described herein are equally applicable to other color-spaces, including color-spaces that have greater than, or less than, three dimensions, such as, for example, the known Cyan, Yellow, Magenta and Black (CYMK) color-space, or, as another example, the known YIQ color-space in which colors are defined in terms of luminance and chrominance. Similarly, the mechanisms described herein are equally applicable to patches of pixels that are more than two adjacent pixels wide and two adjacent pixels high.

Figure 2:
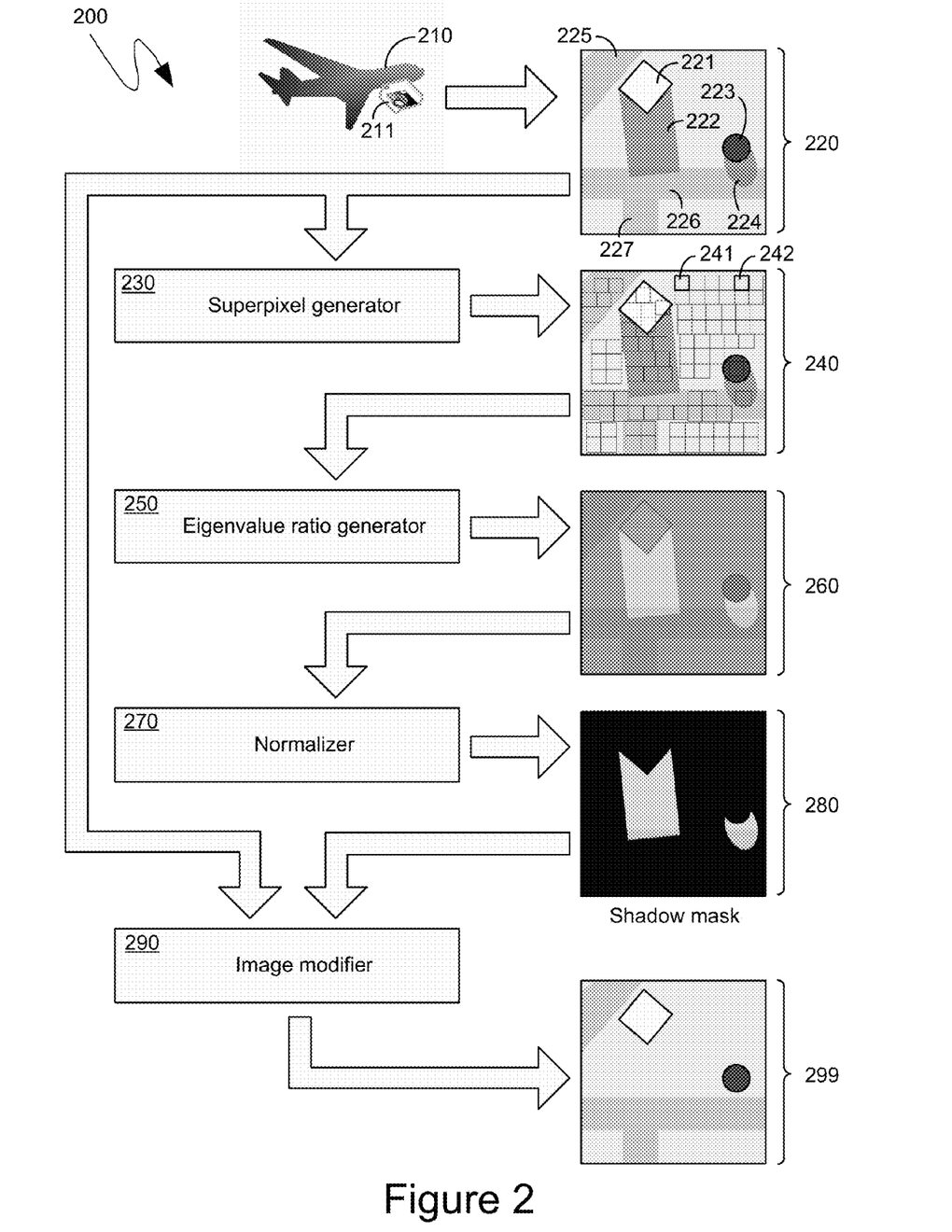
FIG. 2 is a block diagram of an exemplary system for generating a shadow mask for a digital image from that single digital image.

Turning to FIG. 2, the system 200 shown therein illustrates an exemplary system that can identify areas of a digital image that represent objects that are in shadow, such as by generating a "shadow mask". In addition, for purposes of illustration, the system 200 of FIG. 2 additionally includes an exemplary utilization of such a generated shadow mask to modify, or further process, the original image, such as by minimizing the visual effects of the identified shadows in that original image. However, as will be recognized by those skilled in the art, while the system 200 includes a utilization of a generated shadow mask to further process the original image to minimize the effects of such identified shadows, there can exist other utilizations of a shadow mask of an image and the techniques described herein are equally applicable to any such reasons.

Initially, as shown by the system 200 of FIG. 2, a camera 211, exemplarily illustrated as being mounted to an aircraft 210, can take digital images, such as the digital image 220. And while the digital image 220 is illustrated as exemplarily being an aerial image of objects casting shadows, the mechanisms described are not limited to aerial images and, instead, can be applied to any digital image that includes objects that are directly lit and objects that are in shadow. For purposes of providing a specific example to aid in the description of the relevant mechanisms, the digital image 220 can be an aerial photograph of the building 221, casting a shadow 222, and a tree 223, casting a shadow 224. The digital image 220 can further comprise roadways 225, 226 and 227. In one embodiment, the shadows of the object captured by the digital image, such as the shadows 222 and 224 of the objects 221 and 223, respectively, can interfere with automated processing performed of such a digital image. For example, the digital image 220 can be automatically processed to identify the roadways 225, 226 and 227 so as to provide more accurate mapping information. In such an example, the color and intensity of the shadows 222 and 224 can make automated identification of the roadways 225, 226 and 227 more difficult. For example, the shadow 222 can be inaccurately perceived, by the automated processing, as a roadway. Thus, rather then perceiving the roadways 226 and 227 as forming a "T" intersection, the automated processing can, instead, and inaccurately, identify the shadow 222 as part of the roadway 227, and can thereby conclude that the roadway 227 does not terminate at the roadway 226, but instead forms a "four-way" intersection with it. To minimize such errors, the shadows in the image 220, such as the shadows 222 and 224, can be identified so that any further automated processing of the image 220, such as the above illustrated automated processing for the purpose of identifying roadways, can take such shadow information into account.

In one embodiment, images from the camera 211, such as the image 220 can first be provided to a superpixel generator 230. The superpixel generator 230 can group the pixels of the digital image 220 into groups of pixels that relate to the same object, color, illumination or other like similarity relevant to the mechanisms described herein. Such groups of pixels can be identified through any of a myriad of approaches and mechansims. For example, in one embodiment, the superpixel generator 230 can first attempt to identify patches, or groups, of pixels where each of the pixels in the patch is of approximately the same color and where each of the patches is of approximately the same size. In an alternative embodiment, the superpixel generator 230 can simply divide the digital image 220 into patches of pixels and can then reject those patches of pixels where the colors of individual pixels in the patch vary too much. Such rejected patches can be considered too "noisy" and can be the result of a patch across a threshold, or boundary, such as a patch that comprises both the pixels of the building 221 and of the surrounding ground upon which the building 221 is constructed. As yet another alternative, the superpixel generator 230 can utilize small local "windows" onto an image that can encompass only those pixels in a region that represent an object having the same material and under the same illumination for all of those pixels. As yet a further alternative, a bilateral filter can be utilized by the superpixel generator 230 to identify a local neighborhood around a pixel, where the pixels in the local neighborhood share similar color attributes as the selected pixel. To encompass all such groupings of pixels that are relevant to the mechanisms described herein, the term "superpixel" will be utilized. The term "superpixel", as utilized herein, includes, but is not limited to, the known concept of superpixels. Instead, as utilized herein, the term "superpixel" means any collection of pixels where each of the constituent pixels in a such a collection has approximately the same color value and where each superpixel is of approximately the same size. Preferably, the superpixels generated by the superpixel generator 230 can each comprise four, nine or sixteen pixels, specifically in the form of superpixels that are either two pixels wide by two pixels high, three pixels wide by three pixels high, or four pixels wide by four pixels high. As illustrated in FIG. 2, the superpixell generator 230 can generate a superpixelated digital image 240 comprising individual superpixels, such as the superpixels 241 and 242.

Once superpixels, such as the superpixels 241 and 242 have been generated by the superpixel generator 230, the superpixelated image 240 can be provided to the eigenvalue ratio generator 250. In one embodiment, as an initial step, the eigenvalue ratio generator 250 can first determine the eigenvalues of each of the superpixels generated by the superpixel generator 230 in the superpixelated image 240 that was provided to the eigenvalue ratio generator 250. More specifically, and as indicated previously, each superpixel can comprise individual pixels whose color values define individual points in a multidimensional color-space. Since each superpixel comprises an equal number of pixels in both height and width, the individual color values of those individual pixels define a square matrix in the multidimensional color space, thereby providing for the calculation of eigenvalues and eigenvectors in the traditional manner. Thus, each of the superpixels in the superpixelated image 240 that was provided to the eigenvalue ratio generator 250 can have as many eigenvalues and eigenvectors as there are dimensions in the colorspace being utilized.

For each of the superpixels, the eigenvalue ratio generator 250 can not only determine the eigenvalues of those superpixels, but can also compare the first eigenvalue to the second eigenvalue. For example, the ratio between the first and second eigenvalues can be in the form of the first eigenvalue being divided by the second eigenvalue or the inverse, where the second eigenvalue is divided by the first eigenvalue. As indicated previously, if the first eigenvalue is substantially greater than the second eigenvalue, then it is likely that the superpixel is from a portion of the digital image 220 that represents an object that is directly lit. Conversely, as also indicated previously, if the first and second eigenvalues are of approximately the same magnitude, then it is likely that the superpixel is from a portion of the digital image 220 that represents an object that is in shadow. Thus, if the ratio between first and second eigenvalues is expressed by dividing the first eigenvalue by the second eigenvalue, then large values can be indicative of objects that are directly lit, while smaller values, specifically those approaching a value of one, can be indicative of objects that are in shadow. By contrast, if the shadow between the first and second eigenvalues is expressed by dividing the second eigenvalue by the first eigenvalue, then small values can be indicative of objects that are directly lit, while larger values, specifically those approaching a value of one, can be indicative of objects that are in shadow. In one embodiment, a small constant value can be added to the denominator when forming the ratio between the first and second eigenvalues to avoid the possibility of dividing by zero, or very small numbers.

In one embodiment, the eigenvalue ratio generator 250 can, in generating the eigenvalue ratios described above, consider the absolute magnitudes of the eigenvalues. More specifically, if the first eigenvalue is large and the second eigenvalue is small, then, for the reasons described above, it is likely that the corresponding superpixel is of a portion of the digital image 220 that corresponds to an object that is directly lit. As such, the ratio between the first and second eigenvalues, irrespective of the mechanism utilized to generate such a ratio, can be indicative of an object that is directly lit. Similarly, if the first eigenvalue is small and the second eigenvalue is also small, then, for the reasons also described above, it is likely that the corresponding superpixel is of a portion of the digital image 220 that corresponds to an object that is in shadow. As such, the ratio between the first and second eigenvalues, again irrespective of the mechanism utilized to generate such a ratio, can be indicative of an object that is in shadow. However, if magnitudes of the first and second eigenvalues are both large, then while their ratio may indicate that the superpixel corresponds to a portion of the digital image 220 that represents an object that is in shadow, such a conclusion may not necessarily be warranted. Instead, where both the first and second eigenvalues are large, it can be more accurate to conclude that the superpixel has been improperly selected, is noisy, or otherwise does not provide meaningful information regarding whether an object of the digital image 220 is in shadow. As such, in one embodiment, while generating the ratio between the first and second eigenvalues, the eigenvalue ratio generator 250 can consider the absolute magnitudes of such eigenvalues and, in the case where both the first and the second eigenvalues are large, the eigenvalue ratio generator can provide an indicator identifying the superpixel as noisy, instead of providing a ratio that may, improperly, indicate that an object is in shadow.

The results of the eigenvalue ratio generator 250 can be a digital image 260 whose intensity values represent the ratios between the first and second eigenvalues for the superpixels in that digital image. Such a ratio digital image 260 can, in one embodiment, be provided to a normalizer 270 to generate the shadow mask 280, or a shadow probability mask. More specifically, in one embodiment, the normalizer 270 can divide each of the ratios determined by the eigenvalue ratio generator 250 by the intensity of the colors in the corresponding superpixels. The color intensity of a superpixel can be the average color intensity of the individual pixels of the superpixel, the sum of the color intensity of the individual pixels of the superpixel, or another like aggregation of the individual color intensities of the individual pixels of the superpixel.

Once the eigenvalue ratios are normalized by dividing them by the color intensities of all of their corresponding superpixels, the resulting values can be the basis of forming the shadow mask 280. More specifically, the normalizer 270 can apply a threshold determination such that all normalized ratios greater than a threshold value are to be deemed as corresponding to pixels in the digital image 220 that represent an object that is directly lit, assuming that the eigenvalue ratio generator 250 generated the eigenvalue ratio by dividing the first eigenvalue with the second eigenvalue. Analogously, all normalized ratios less than such a threshold value are to be deemed as corresponding to pixels in the digital image 220 that represent an object that is in shadow. If, on the other hand, the eigenvalue ratio generator 250 generated the eigenvalue ratio by dividing the second eigenvalue with the first eigenvalue, then the normalizer can apply a threshold determination such that all normalized ratios less than that threshold value are to be deemed as corresponding to pixels in the digital image 220 that represent an object that is directly lit, and all normalized ratios greater than that threshold value are to be deemed as corresponding pixels in the digital image 220 that represent an object that is in shadow. The resulting shadow mask 280 can indicate which areas of the digital image 220 were on the side of the threshold indicating that they represented objects that were directly lit, and which areas of the digital image 220 were on the side of the threshold indicating that they represented objects that were in shadow.

As an illustrative example, the shadow mask 280 can then be utilized with the original digital image 220 by, for example, an image modifier 290, that can modify the image 220, in accordance with the shadow information presented by the shadow mask 280, to generate a modified image 299 that can be more easily consumed by whatever further downstream automated processing may exist. For example, returning to the above example where the digital image 220 is utilized for automatic identification of roadways, the image modifier 290 can utilize the shadow information contained in the shadow mask 280 to digitally alter those portions of the digital image 220 that comprise the shadows, such as the shadows 222 and 224, to remove the visual impact of such shadows, thereby making automatic identification of roadways easier.

In another embodiment, the normalizer 270, instead of normalizing the eigenvalue ratios determined by the eigenvalue ratio generator by the intensity of the corresponding superpixel, can instead normalize the eigenvalue ratios by confining them to a range between zero and one. For example, one manner in which such a normalization could be performed would be to divide each of the eigenvalue ratios by the largest, in magnitude, eigenvalue ratio such that all of the ratios are converted to a range of values between zero and one. The resulting values can then be utilized to generate a shadow probability mask. For example, a normalized eigenvalue ratio of 0.5 can be utilized to indicate a 50% probability that the corresponding superpixel is representative of a physical object that is in shadow. Other weightings can also be applied in generating the shadow probability mask, as will be recognized by those skilled in the art.

Figure 3:
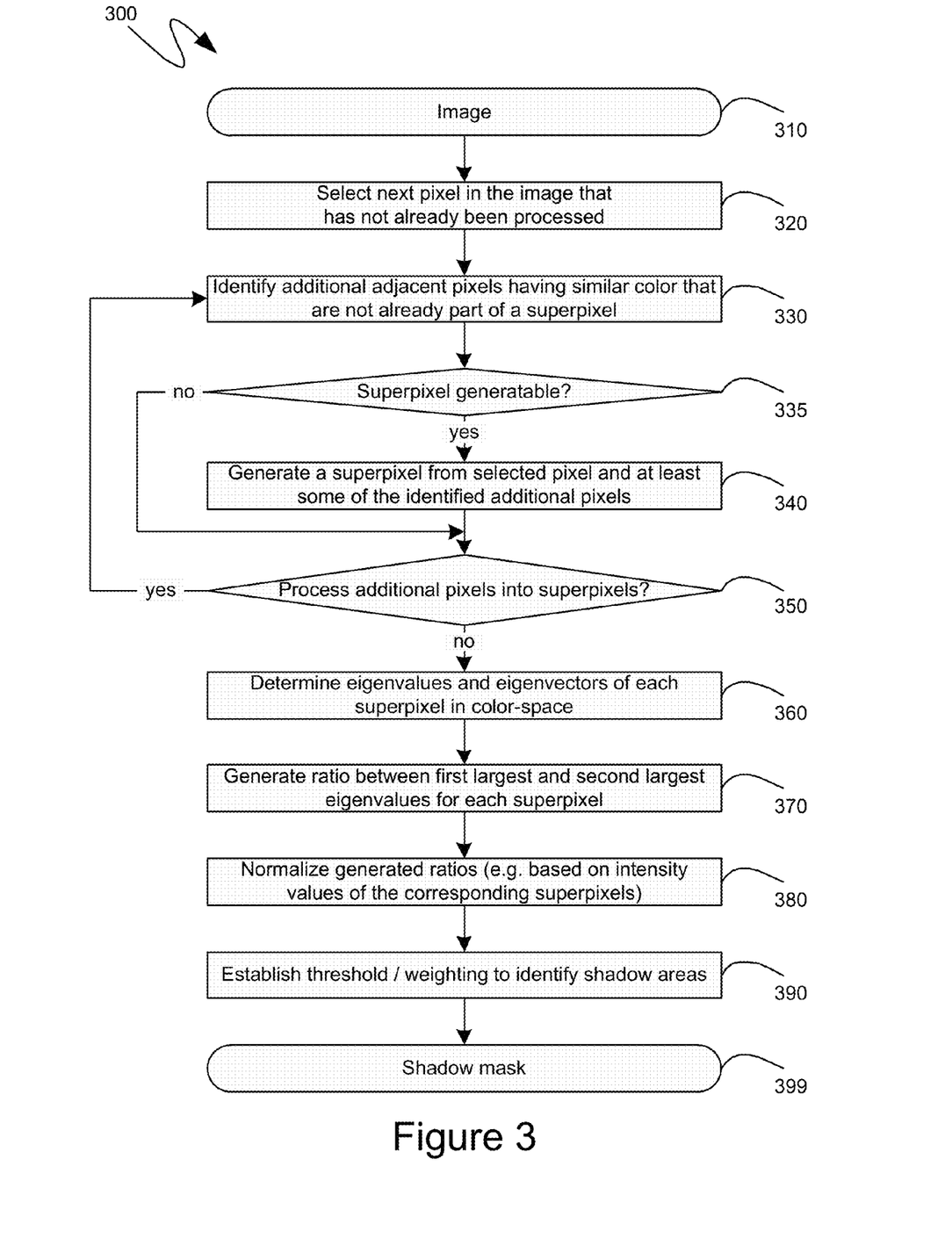
FIG. 3 is a flow diagram of an exemplary system for generating a shadow mask for a digital image from that single digital image.

Turning to FIG. 3, the flow diagram 300 shown therein illustrates an exemplary series of steps that could be performed, either by a singular component, or by individual components, such as were illustrated by the system 200 of FIG. 2. Initially, as shown by the step 310, an individual digital image can be received. Subsequently, at step 320, a pixel in that image can be selected that, as will be described further below, has not already been processed to determine if it could be included as part of a superpixel. At step 330, additional adjacent pixels having color values similar to the pixel that was selected at step 320 can be identified. As in step 320, the adjacent pixels identified in step 330 can also be the pixels that are not already part of a superpixel. Subsequently, at step 335, at determination can be made as to whether a superpixel can properly be generated from the pixel selected at step 320. For example, as indicated previously, in one embodiment, superpixels are selected so as not to span edges or divisions between two or more different objects or colors within the image received at step 310. Thus, in such an embodiment, if the pixel selected at step 320 is on or near an edge, such that surrounding pixels do not have similar colors, then no pixels, or too few pixels, can have been identified at step 330 and, consequently, at step 335, it can be determined that no superpixel can be generated and processing can skip to step 350. Alternatively, if, at step 335, it is determined that a superpixel can be generated, then processing can proceed to step 340, where a superpixel can be generated from at least some of the pixels selected at steps 320 and 330. For example, if the superpixels that are being generated by step 340 are of a particular size, and the quantity of pixels identified by steps 320 and 330 are substantially greater than that size, then, at step 340, only some of the pixels identified by steps 320 and 330 can be selected to be part of the generated superpixel. The remaining pixels can then be selected a subsequent time, by a subsequent iteration of steps 320 and 330, and can be combined into one or more superpixels by subsequent iterations of step 340.

At step 350, a determination can be made as to whether there have been enough superpixels generated for the remaining steps. For example, in one embodiment, step 350 can determine whether there are any pixels remaining in the image that have not either already been processed by steps 320 through 340, or otherwise have been generated into a superpixel. If such pixels remain, then processing can return to step 320, as shown by the flow diagram 300 of FIG. 3. Conversely, if no such pixels remain, then processing can proceed with step 360. Alternatively, step 350 can determine whether another threshold has been reached, such as, for example, whether a sufficient percentage of the image, or of identified portions of the image, have had superpixels generated. Thus, as can be seen, not every pixel of an image need be part of a superpixel or even processed for determination as to whether such a pixel could be included as part of a superpixel. Additionally, as will also be recognized by those skilled in the art, steps 320 through 350 are meant to generally illustrate the application of known techniques for generating superpixels to the particular mechanisms described. Consequently, known optimizations and permutations of such mechanisms for generating superpixels can be equally adapted to those described herein for purposes of generating the specific types of superpixels utilized by the mechanisms described herein.

At step 360, the eigenvalues and eigenvectors of each superpixel can be determined based on the color values of the individual pixels of each superpixel, as represented in multi-dimensional color-space. Subsequently, at step 370 a ratio can be generated between the first largest eigenvalue and the second largest eigenvalue for each superpixel. In one embodiment, as indicated previously, the generation of the ratio at step 370 can take into account the absolute values of the first largest and second largest eigenvalues such that if the first eigenvalue and the second eigenvalue are both large, then, rather than generating the ratio between them, the processing performed at step 370 can, instead, return an indication that that particular superpixel is noisy, or would otherwise result in a ratio that may be inaccurate for the purposes of generating a shadow mask.

Once a ratio between the first and second eigenvalues has been generated at step 370 for each of the superpixels, processing can proceed to step 380 where those generated ratios can be normalized, such as for example, based on the intensity values of their corresponding superpixels or, as another example, based on the largest ratio to constrain the ratios to values between zero and one. As indicated previously, the intensity of a superpixel can be based on the average color intensity values of the individual pixels that comprise the superpixel, can be based on a summation of the color intensity values of those individual pixels, or can be based on another analogous amalgamation of the individual color intensity values of the individual pixels that comprise the superpixel. At step 390, a threshold can be applied to identify shadow areas. More specifically, and as indicated previously, if the ratio generated by step 370 was generated by dividing the first eigenvalue with the second eigenvalue, then superpixels having normalized ratios above a certain threshold can be considered to correspond to portions of the digital image, received at step 310, that represent objects that are directly lit, and superpixels having normalized ratios below that threshold can be considered to correspond to portions of that digital image that represent objects that are in shadow. Conversely, if the ratio generated by step 370 was generated by dividing the second eigenvalue with the first eigenvalue, then superpixels having normalized ratios below a threshold can be considered to correspond to portions of the digital image, received at step 310, that represent objects that are directly lit, and superpixels having normalized ratios above that threshold can be considered to correspond to portions of that digital image that represent objects that are in shadow. The application of such a threshold, by the step 390, can result in a shadow mask that can identify those portions of the digital image received at step 310 that are deemed to be in shadow.

Alternatively, if the normalizing, at step 380, were to normalize the ratio generated by step 370 to a range of values between zero and one, then step 390 can establish a weighting that can be applied to generate a shadow probability mask that can indicate the probability of an associated superpixel representing an object that is in shadow. The relevant processing can then end, at step 399, with the generation of the shadow mask, which can either be a binary shadow mask, delineating areas of the image received at step 310 that represent objects that are determined to be in shadow from those that are determined to be directly lit, or it can be a shadow probability mask that can identify a probability that areas of the image, received at step 310, represent objects that are in shadow.

Figure 4:
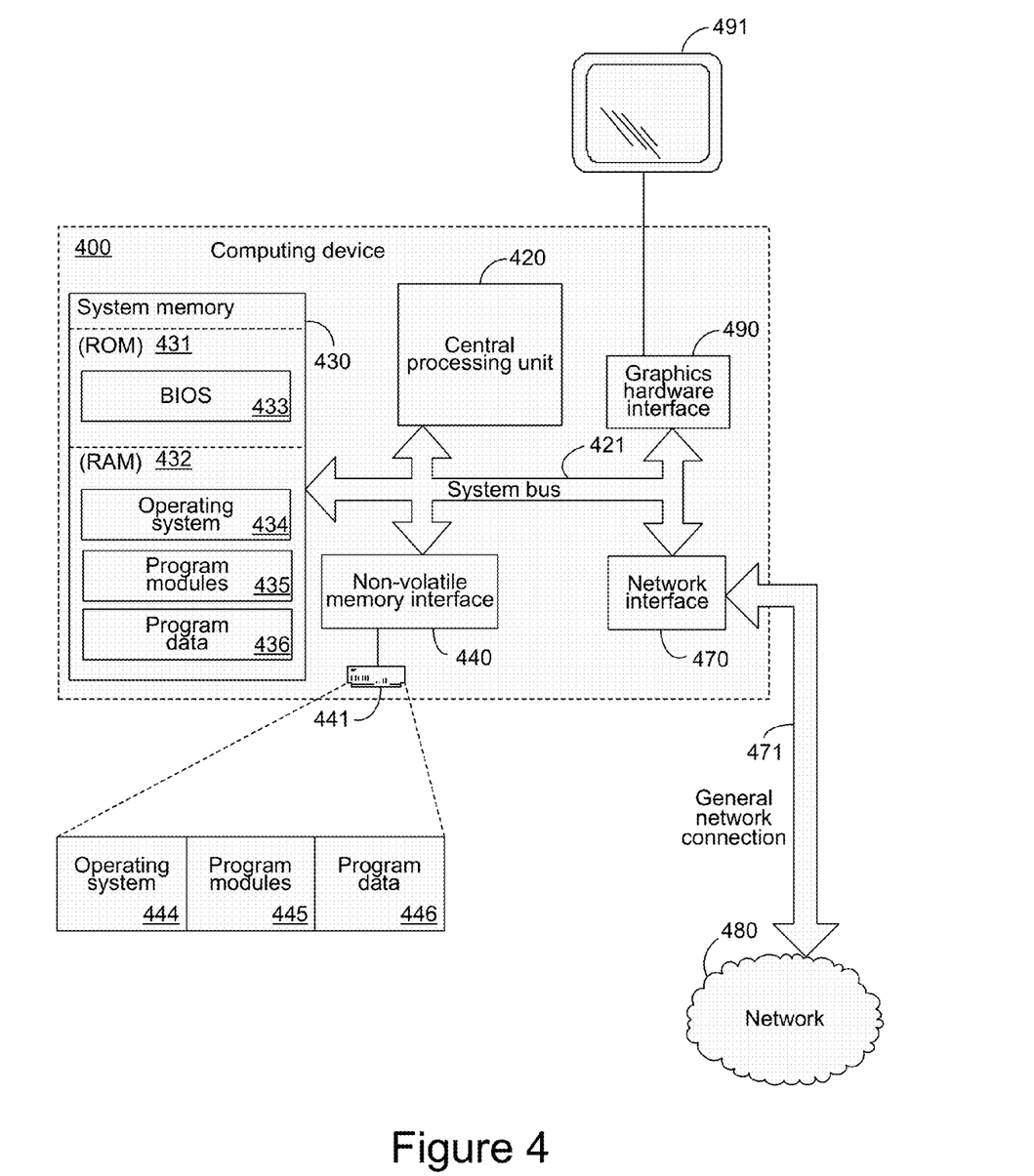
FIG. 4 is a block diagram of an exemplary computing device.

Turning to FIG. 4, an exemplary computing device 400 is illustrated. The exemplary computing device 400 of FIG. 4 can include, but is not limited to, one or more central processing units (CPUs) 420, a system memory 430, that can include RAM 432, and a system bus 421 that couples various system components including the system memory to the processing unit 420. The system bus 421 may be any of several types of bus structures including a memory bus or memory controller, a peripheral bus, and a local bus using any of a variety of bus architectures. The computing device 400 can optionally include graphics hardware, such as for the display of visual user interfaces, including, but not limited to, a graphics hardware interface 490 and a display device 491. Depending on the specific physical implementation, one or more of the CPUs 420, the system memory 430 and other components of the computing device 400 can be physically co-located, such as on a single chip. In such a case, some or all of the system bus 421 can be nothing more than silicon pathways within a single chip structure and its illustration in FIG. 4 can be nothing more than notational convenience for the purpose of illustration.

The computing device 400 also typically includes computer readable media, which can include any available media that can be accessed by computing device 400 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and the aforementioned RAM 432. A basic input/output system 433 (BIOS), containing the basic routines that help to transfer information between elements within computing device 400, such as during start-up, is typically stored in ROM 431. RAM 432 typically contains data and/or program modules that are immediately accessible to and/or presently being operated on by processing unit 420. By way of example, and not limitation, FIG. 4 illustrates the operating system 434 along with other program modules 435, and program data 436.

The computing device 400 may also include other removable/non-removable, volatile/nonvolatile computer storage media. By way of example only, FIG. 4 illustrates the hard disk drive 441 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440.

The drives and their associated computer storage media discussed above and illustrated in FIG. 4, provide storage of computer readable instructions, data structures, program modules and other data for the computing device 400. In FIG.

4, for example, hard disk drive 441 is illustrated as storing operating system 444, other program modules 445, and program data 446. Note that these components can either be the same as or different from operating system 434, other program modules 435 and program data 436. Operating system 444, other program modules 445 and program data 446 are given different numbers hereto illustrate that, at a minimum, they are different copies.

The computing device 400 can operate in a networked environment using logical connections to one or more remote computers. The computing device 400 is illustrated as being connected to the general network connection 471 through a network interface or adapter 470 which is, in turn, connected to the system bus 421. In a networked environment, program modules depicted relative to the computing device 400, or portions or peripherals thereof, may be stored in the memory of one or more other computing devices that are communicatively coupled to the computing device 400 through the general network connection 471. It will be appreciated that the network connections shown are exemplary and other means of establishing a communications link between computing devices may be used.

As can be seen from the above descriptions, mechanisms for identifying shadows within a single digital image have been presented. In view of the many possible variations of the subject matter described herein, we claim as our invention all such embodiments as may come within the scope of the following claims and equivalents thereto.

We claim:

1. One or more computer-readable memory comprising computer-executable instructions for generating a shadow mask of a digital image of a physical scene that identifies those areas of the digital image corresponding to physical elements in the physical scene that are in shadow, the computer-executable instructions performing steps comprising:
   grouping adjacent pixels of the digital image into superpixels such that a superpixel comprises an equal number of pixels in height and width and such that each superpixel comprises approximately a same number of pixels;
   determining, for a first superpixel, both a largest eigenvalue and a next-largest eigenvalue given points in color-space defined by colors of constituent pixels of the first superpixel;
   generating, for the first superpixel, a ratio between the largest eigenvalue and the next-largest eigenvalue;
   repeating the determining and the generating for multiple other superpixels only from the digital image;
   normalizing, for each superpixel of the first superpixel and the multiple other superpixels, the generated ratio; and
   generating the shadow mask in accordance with the normalized ratio.

2. The computer-readable storage media of claim 1, wherein the computer-executable instructions for grouping the adjacent pixels into the superpixels comprise computer-executable instructions for grouping the adjacent pixels into the superpixels such that all pixels grouped into a superpixel have approximately a same color value.

3. The computer-readable storage media of claim 1, comprising further computer-executable instructions for rejecting, prior to the determining the largest and the next-largest eigenvalues, those superpixels whose constituent pixels do not have approximately a same color value.

4. The computer-readable storage media of claim 1, comprising further computer-executable instructions for rejecting, prior to the generating the ratio, those superpixels having the largest eigenvalue and the next-largest eigenvalue both be large.

5. The computer-readable storage media of claim 1, wherein the computer-executable instructions for generating the ratio further comprise computer-executable instructions for adding a small constant value to a denominator prior to the generating the ratio.

6. The computer-readable storage media of claim 1, wherein the normalizing is performed based on a color intensity of a corresponding superpixel, the computer-readable media comprising further computer-executable instructions for setting a threshold value such that, if the ratio was generated by dividing the largest eigenvalue by the next-largest eigenvalue, then those superpixels having normalized ratios below the threshold will be deemed to be the areas of the digital image corresponding to the physical elements in the physical scene that are in shadow and if the ratio was generated by dividing the next-largest eigenvalue by the largest eigenvalue, then those superpixels having normalized ratios above the threshold will be deemed to be the areas of the digital image corresponding to the physical elements in the physical scene that are in shadow; and wherein further the computer-executable instructions for generating the shadow mask comprise computer-executable instructions for generating a binary shadow mask in accordance with the threshold value.

7. The computer-readable storage media of claim 1, wherein the normalizing constrains the generated ratio to a range between zero and one, the computer-readable media comprising further computer-executable instructions for applying a weighting to the normalized ratio; and wherein further the computer-executable instructions for generating the shadow mask comprise computer-executable instructions for generating a shadow probability mask in accordance with the weighted normalized ratio.

8. A method for generating a shadow mask of a digital image of a physical scene that identifies those areas of the digital image corresponding to physical elements in the physical scene that are in shadow, the method comprising the steps of:
   grouping adjacent pixels of the digital image into superpixels such that a superpixel comprises an equal number of pixels in height and width and such that each superpixel comprises approximately a same number of pixels;
   determining, for a first superpixel, both a largest eigenvalue and a next-largest eigenvalue given points in color-space defined by colors of constituent pixels of the first superpixel;
   generating, for the first superpixel, a ratio between the largest eigenvalue and the next-largest eigenvalue;
   repeating the determining and the generating for multiple other superpixels only from the digital image;
   normalizing, for each superpixel of the first superpixel and the multiple other superpixels, the generated ratio; and
   generating the shadow mask in accordance with the normalized ratio.

9. The method of claim 8, wherein the grouping the adjacent pixels into the superpixels comprises grouping the adjacent pixels into the superpixels such that all pixels grouped into a superpixel have approximately a same color value.

10. The method of claim 8, further comprising the steps of rejecting, prior to the determining the largest and the next-largest eigenvalues, those superpixels whose constituent pixels do not have approximately a same color value.

11. The method of claim 8, further comprising the steps of rejecting, prior to the generating the ratio, those superpixels having the largest eigenvalue and the next-largest eigenvalue both be large.

12. The method of claim 8, wherein the generating the ratio further comprises adding a small constant value to a denominator prior to the generating the ratio.

13. The method of claim 8, wherein the normalizing is performed based on a color intensity of a corresponding superpixel, the method further comprising the steps of setting a threshold value such that, if the ratio was generated by dividing the largest eigenvalue by the next-largest eigenvalue, then those superpixels having normalized ratios below the threshold will be deemed to be the areas of the digital image corresponding to the physical elements in the physical scene that are in shadow and if the ratio was generated by dividing the next-largest eigenvalue by the largest eigenvalue, then those superpixels having normalized ratios above the threshold will be deemed to be the areas of the digital image corresponding to the physical elements in the physical scene that are in shadow; and wherein further the generating the shadow mask comprises generating a binary shadow mask in accordance with the threshold value.

14. The method of claim 8, wherein the normalizing constrains the generated ratio to a range between zero and one, the method further comprising the steps of applying a weighting to the normalized ratio; and wherein further the generating the shadow mask comprises generating a shadow probability mask in accordance with the weighted normalized ratio.

15. A system for processing digital images of physical scenes that comprise physical elements that are in shadow, the system comprising:

a shadow mask generator for generating a shadow mask of a digital image from only that digital image, the generated shadow mask identifying those areas of the digital image corresponding to the physical elements that are in shadow; and an image modifier for modifying the digital image in accordance with the shadow mask;

wherein the shadow mask generator comprises: a superpixel generator for grouping adjacent pixels of the digital image into superpixels such that a superpixel comprises an equal number of pixels in height and width and such that each superpixel comprises approximately a same number of pixels; an eigenvalue ratio generator for determining, for each superpixel, both a largest eigenvalue and a next-largest eigenvalue given points in color-space defined by colors of constituent pixels of each superpixel and for generating, for each superpixel, a ratio between the largest eigenvalue and the next-largest eigenvalue; and a normalizer for normalizing, for each superpixel, the generated ratio, wherein the shadow mask generator generates the shadow mask in accordance with the threshold value.

16. The system of claim 15, wherein the superpixel generator generates the superpixels such that all pixels grouped into a superpixel have approximately a same color value.

17. The system of claim 15, wherein the superpixel generator rejects those superpixels whose constituent pixels do not have approximately a same color value.

18. The system of claim 15, wherein the eigenvalue ratio generator rejects those superpixels having the largest eigenvalue and the next-largest eigenvalue both be large.

19. The system of claim 15, wherein the normalizer performs the normalizing based on a color intensity of a corresponding superpixel; wherein further the shadow mask generator further comprises a threshold generator for setting a threshold value such that, if the ratio was generated by dividing the largest eigenvalue by the next-largest eigenvalue, then those superpixels having normalized ratios below the threshold will be deemed to be the areas of the digital image corresponding to the physical elements in the physical scene that are in shadow and if the ratio was generated by dividing the next-largest eigenvalue by the largest eigenvalue, then those superpixels having normalized ratios above the threshold will be deemed to be the areas of the digital image corresponding to the physical elements in the physical scene that are in shadow; and wherein further the generation of the shadow mask comprises generating a binary shadow mask in accordance with the threshold value.

20. The system of claim 15, wherein the normalizer performs the normalizing so as to constrain the generated ratio to a range between zero and one; wherein further the shadow mask generator further comprises a weighing generator for applying a weighting to the normalized ratio; and wherein further the generation of the shadow mask comprises generating a shadow probability mask in accordance with the weighted normalized ratio.

* * * * *